(12) United States Patent
Shin (10) Patent No.: US 7,346,351 B2
(45) Date of Patent: Mar. 18, 2008

(54) MOBILE COMMUNICATION SYSTEM AND METHOD OF PROCESSING HANDOFF FOR THE SAME

(75) Inventor: Yeong Jong Shin, Kunpo-shi (KR)

(73) Assignee: LG Electronics Inc., Seoul (KR)

( * ) Notice: Subject to any disclaimer, the term of this patent is extended or adjusted under 35 U.S.C. 154(b) by 777 days.

(21) Appl. No.: 10/325,825

(22) Filed: Dec. 23, 2002

(65) Prior Publication Data

US 2003/0119511 A1 Jun. 26, 2003

(30) Foreign Application Priority Data

Dec. 21, 2001 (KR) ............... 2001-82709

(51) Int. Cl.
*H04Q 7/20* (2006.01)
(52) U.S. Cl. .............. 455/439; 370/331; 370/328; 455/438; 455/561
(58) Field of Classification Search ........... 370/331, 370/330, 344, 317, 328; 435/442, 436, 437, 435/438, 443; 455/439, 438, 561
See application file for complete search history.

(56) References Cited

U.S. PATENT DOCUMENTS

| 6,456,847 B1 * | 9/2002 | Lilja et al. ............. 455/437 |
| 6,549,524 B1 * | 4/2003 | Shin .................... 370/331 |
| 2007/0066270 A1 * | 3/2007 | Dantu et al. ............ 455/331 |

* cited by examiner

*Primary Examiner*—Danh Le
(74) *Attorney, Agent, or Firm*—Ked & Associates, LLP

(57) ABSTRACT

A mobile communication system and a method of processing a handoff for the same is disclosed. A gateway control station performs matching of two system regions for a handoff process between the two system regions, and matches gateway base stations. The gateway base station uses respective primary frequencies among frequencies used in terminal base stations of the two systems which are located in a boundary region between the two system regions as common used frequencies, and controls a handoff cell which is defined as at least a portion of two cell sectors that belong to the two base stations and which uses the two common frequencies.

19 Claims, 4 Drawing Sheets

MOBILE COMMUNICATION SYSTEM AND METHOD OF PROCESSING HANDOFF FOR THE SAME

BACKGROUND OF THE INVENTION

1. Field of the Invention

The present invention relates to a mobile communication system and a method of processing a handoff for the same.

2. Background of the Related Art

A CDMA mobile communication system includes mobile stations for moving around unspecified regions, base stations for reception/transmission of messages from/to the mobile stations and managing radio resources, a control station for controlling the base stations and reception/transmission of messages from/to the base stations, and a mobile switching center for connection to the control station, mobile switching centers of other communication systems or other communication networks, for communication between mobile stations or between the mobile station and a fixed station to facilitate communication anytime, anywhere, and with anybody within the communication network.

One feature of the mobile communication system is the assurance of maintaining communication in view of the mobility of the subscriber's mobile station. One method of supporting this feature is hand off technology. The hand off technology is a technology for switching a communication path between the mobile station and the base station so that communication can be continuous, even as the mobile station moves in relation to the base station that provides the mobile station with a service, or a service region of a sector.

Typically, there are three types of hand off: a soft hand off, a softer hand off, and a hard hand off. The soft hand off occurs when the mobile station moves between adjacent base stations while a frequency and a frame offset are maintained. In soft hand off, the mobile station sets up another communication path between cells of a destination base station, while the present communication path between the mobile station and the base station is maintained for a time period, to transmit a voice packet and/or a data packet on many channels. The present communication path is dropped when the mobile station moves to a destination cell where maintenance of the present communication channel is no longer required. The softer hand off occurs when the mobile station moves between sectors covered by the same base station, while a frequency and a frame offset are maintained wherein the mobile station sets up a new communication path with a destination. In softer hand off, the present communication path between the mobile station and the base station is maintained, in order to support the transmission of a voice packet and/or a data packet on many channels. The present communication path is dropped when the mobile station approaches the destination sector within a sufficient distance such that maintenance of the present communication path is not required anymore.

The hard hand off occurs if the frame offset is changed, or the used frequency group is changed. Another instance of hard hand off occurs when the mobile station moves to an adjacent base station, or the mobile station moves to another mobile switching center, wherein unlike the softer hand off or the soft hand off, the mobile station can not maintain the present communication path, but a newly set up communication path is used in transmission of the voice packet and/or data packer.

The softer or soft handoff in the CDMA mobile communication system in which both base stations use the same frequency proceeds smoothly without dropping calls, since no ping-pong of the hand off has occurred. Ping-pong is a term of art used to characterize a repeated hand off process. However, the softer or soft hand off cannot be used between systems using different, respective frequency groups because the ping-pong of hand off of the different frequencies leads to a very high call drop ratio. In order to process the hand off between different system provider regions, it is desired that each of the base stations of the systems is provided with a pilot beacon for giving information on a hand off starting time point to the base stations and the mobile station, respectively.

Figure 1:
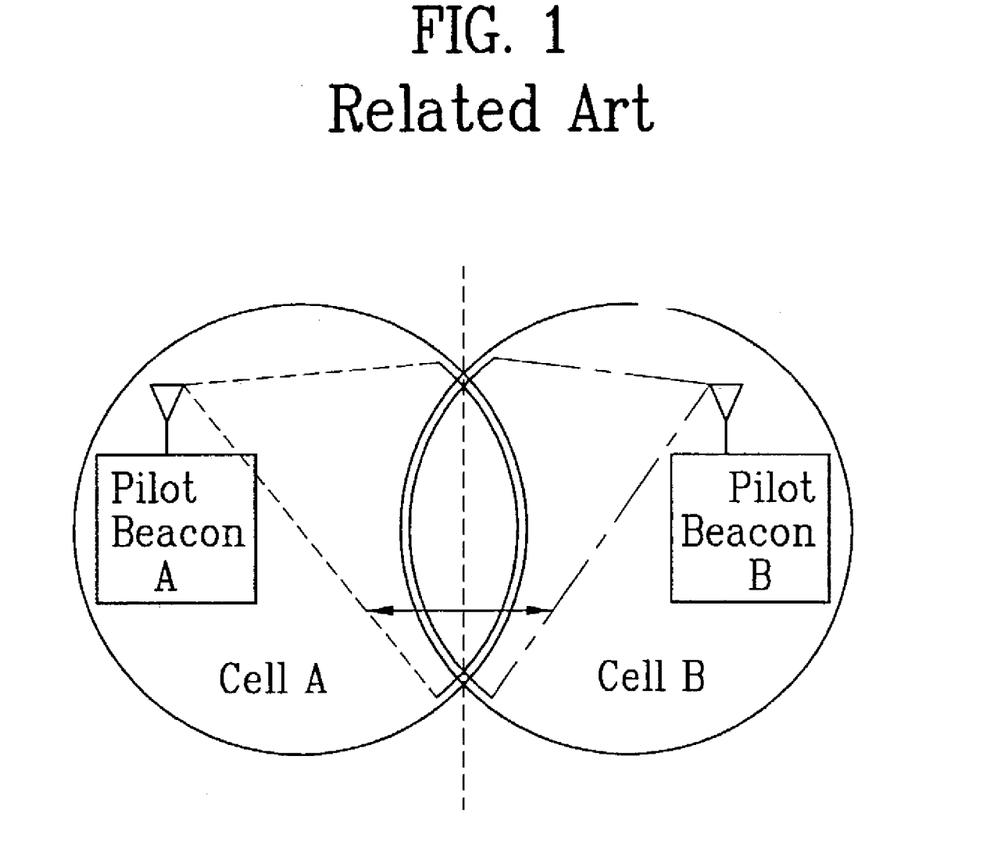
FIG. 1 is a diagram illustrating a related art handoff cell between network provider regions.

FIG. 1 illustrates a region between cells in a related art CDMA mobile communication system. FIG. 1 shows the information on a hand off starting time point to the mobile station, in case the mobile station moves from a cell 'A' to a cell 'B', the pilot beacon B provided to the cell 'B' area transmits a pilot signal of a frequency used in the cell 'A' at a strength the same with a signal strength at a boundary area of the cell 'B' for making hand off from the cell 'A' to the cell 'B'. In case the mobile station moves from a cell 'B' to a cell 'A', the pilot beacon A provided to the cell 'A' area transmits a pilot signal of a frequency used in the cell 'B' at a strength the same with a signal strength at a boundary area of the cell 'A' for making hand off from the cell 'B' to the cell 'A'.

However, the movement causes the ping-pong of hand off in which a call add/drop occurs repeatedly, due to the ceaseless variation of the signal strengths of frequencies of the cells in the boundary area in hand off process, which causes a drop of a call in the boundary area of systems.

More particularly, a related art handoff process is performed using the pilot beacons A and B as shown in FIG. 1. When a calling mobile station (or terminal) is communicating with a called mobile station as it is moving from the cell A to the cell B, the calling mobile station may estimate a strength of the pilot signal having the same frequency as in the cell A, the pilot signal is sent by the pilot beacon B.

Specifically, if the signal strength of the pilot signal meets the handoff condition, or criteria, the calling mobile station (MS) transmits a Pilot signal Strength Measurement Message (PSMM) to the base station A. The base station in cell A analyzes the message, and performs an inter-frequency hard handoff of a call from the cell A to the cell B, so that the calling mobile station may communicate with the called mobile station through the cell B. However, in the boundary area of the two cells A and B, strengths of pilot signals received from the two cells A and B are continuously varied, and thus the inter-frequency hard handoff of the call from the cell B to the cell A may be performed again.

As mentioned earlier, the repeated handoff process is called the ping-pong phenomenon. During the ping-pong process, the strength of pilot signals meets the handoff condition, but the call is disconnected since a signal strength of a forward traffic channel or a reverse traffic channel is weak. Also, the respective pilot beacons should transmit the pilot signals for all the frequency groups used by different network provider regions.

The related art technology as described above has the following disadvantages. First, since the hard handoff is a type of inter-frequency hard handoff, the call drop is frequently produced in the boundary area of the two different network provider regions due to the ping-pong phenomenon and other factors influencing hand off.

Second, due to the frequent production or additional occurrence of the ping-pong phenomenon, an additional load is produced with regard to the handoff-related message, and the load causes the communication quality for the call to deteriorate.

Third, the respective pilot beacons should transmit the pilot signals for all the frequency groups used by the different network provider regions and is a costly solution.

SUMMARY OF THE INVENTION

The present invention is directed to a CDMA mobile communication system and handoff processing method in the CDMA mobile communication system that substantially obviates one or more problems due to limitations and disadvantages of the related art.

An object of the present invention is to provide a CDMA mobile communication system and a handoff processing method between different network provider regions in the CDMA mobile communication system that can achieve the stability and accuracy of a handoff.

Another object of the present invention is to provide a CDMA mobile communication system and a handoff processing method between different network provider regions in the CDMA mobile communication system that can achieve the economy and extension when implementing the CDMA communication system.

Still another object of the present invention is to provide a CDMA mobile communication system and a handoff processing method between different network provider regions in the CDMA mobile communication system having compatibility between the two different systems.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile communication system comprises a first communication system and a second communication system using different frequency groups, respectively, a gateway control station for matching the communication channels of the two systems for a handoff process between the two systems, and a gateway base station for using respective primary frequency groups of base stations located in terminal of the two systems as commonly used frequency groups, and controlling a handoff cell defined as at least a portion of two sectors that belong to the two base stations located in terminal of the two systems.

Preferably, one portion of the handoff cell includes a portion of the cell that belongs to the first system, and another portion of the handoff cell includes a portion of the cell that belongs to the second system.

Preferably, the sectors of the handoff cell are overlapped with the same signal strength from omni antennas, also known as omnidirectional antennas.

Preferably, the handoff between the two systems includes sequential processes of intra-cell hard handoff, a soft handoff, at least one of an inter-frequency hard handoff and an inter-sector hard handoff, and the soft handoff.

According to another aspect of the present invention, a method of processing a handoff in a mobile communication system, comprises the steps of arranging a gateway control station that accommodates all standards of a network provider region A and a network provider region B. A gateway base station matches the communication channels of the gateway control station in a boundary area of the provider regions A and B, defining a handoff cell belonging to the gateway station by overlapping sectors belonging to respective terminal base stations of the provider region A and the provider region B, wherein the sectors are overlapped with the same signal strength using an omnidirectional antenna, selecting a primary frequency group Fa-1 of the frequency groups Fa and a primary frequency group Fb-1 of another frequency groups Fb as frequency groups commonly used by the gateway base station, and processing a handoff in multistage that includes a soft handoff and a hard handoff when a mobile station moves from the sector of one of the regions A and B to the sector of the other of the regions passing through the handoff cell.

Preferably, the gateway base station includes a handoff function between the sectors and a handoff function between the frequency groups during a handoff control operation.

Preferably, the multistage handoff procedure includes sequential processes of intra-cell hard handoff, a soft handoff, at least one of an inter-frequency hard handoff and an inter-sector hard handoff, and the soft handoff.

Preferably, if the number of calls using the primary frequency Fb-1 in the provider region B is greater than that of other calls using frequency groups, it further comprises the step of performing an intra-cell hard handoff of the calls from the primary frequency Fb-1 to one of the other frequency groups used in the provider region B.

According to still another aspect of the present invention, a method of processing a handoff in a mobile communication system, comprises the steps of performing an intra-cell handoff of a call in a first communication system when a first sector of a first terminal base station the first system is included in an active set, performing a first soft handoff of the call from the first sector to one portion of a handoff cell is defined as at least a portion of two sectors that belong to two terminal base stations of the two systems, when the one portion of the handoff cell is added in the active set, performing at least one of an inter-frequency handoff and inter-sector handoff of the call from the one portion to other portion of the handoff cell, when the first sector is dropped in the active set, and performing a second soft handoff of the call from the other portion of the handoff cell to a second sector of a second terminal base station of the second system, when the second base station is added in the active set.

Preferably, if the number of calls using the predetermined frequency group of the second system is greater than that of other calls using frequency groups, it further comprises the step of performing an intra-cell handoff of the call from the predetermined frequency group to one of the other frequency groups used in the second system.

It is to be understood that both the foregoing general description and the following detailed description of the present invention are exemplary and explanatory and are intended to provide further explanation of the invention as claimed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 2:
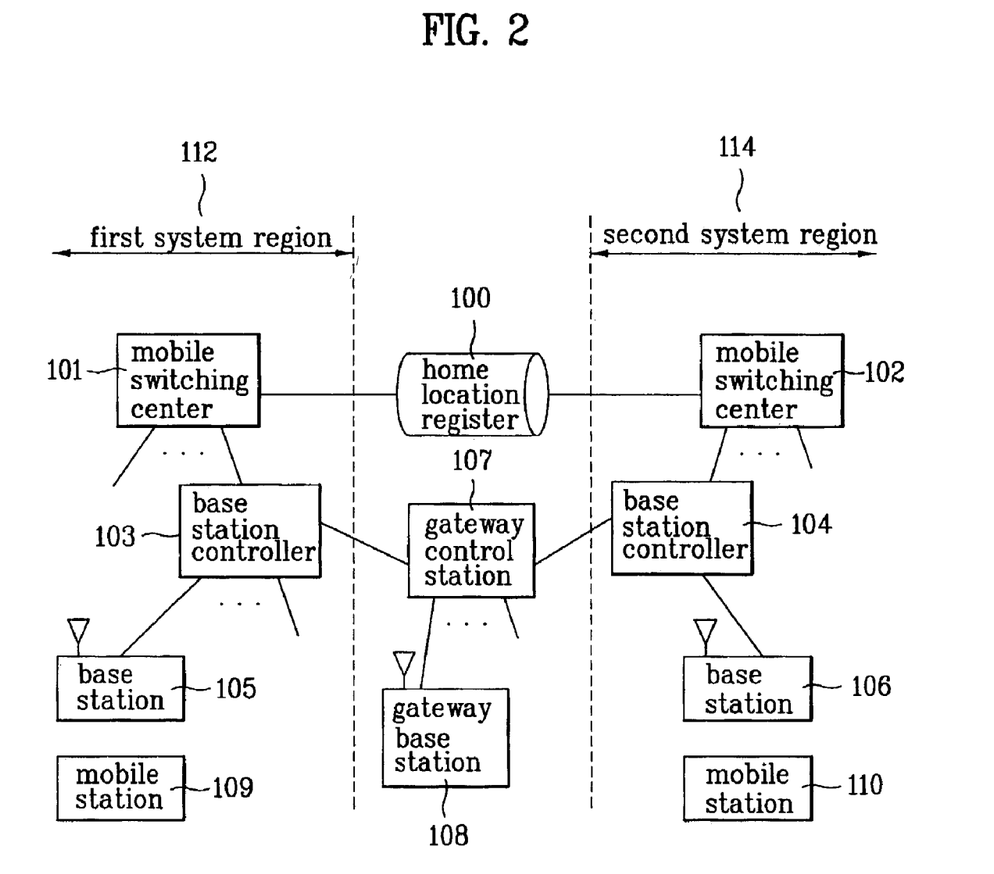
FIG. 2 is a diagram illustrating an exemplary embodiment of a CDMA mobile communication system according to the present invention.

FIG. 2 is a diagram illustrating an exemplary embodiment of a CDMA mobile communication system according to a preferred embodiment of the present invention. Referring to FIG. 2, the CDMA mobile communication system includes a plurality of sub-communication systems. One of the sub-communication systems includes a home location register 100, a gateway base station 108, and a gateway control station 107 for matching other sub-communication systems with each other.

The other sub-communication systems includes mobile stations 109 and 110 which are subscriber terminals, base stations (BSs) 105 and 106 for radio-interfacing with the mobile stations 109 and 110, base station controllers (BSCs) 103 and 104 for controlling the base stations 105 and 106 and voice-coding voice packets, and mobile switching centers 101 and 102 for switching from a calling mobile station to a corresponding-called mobile station after translating numbers provided by the calling mobile station. In FIG. 2, 112 refers to a first system region and 114 refers to a second system region. Also FIG. 2 shows where the various sub-communication systems are located in the exemplary embodiment discussed.

The home location register (HLR) 100 is coupled between the mobile switching centers 101 and 102, for storing and processing location information of the mobile stations 109 and 110 for paging the mobile stations 109 and 110. One gateway control station 107 is provided between the two sub-communication systems for controlling the gateway base station 108, which is located between the base stations 105 and 106 of the two sub-communication systems for matching the gateway control station 107.

Figure 3:
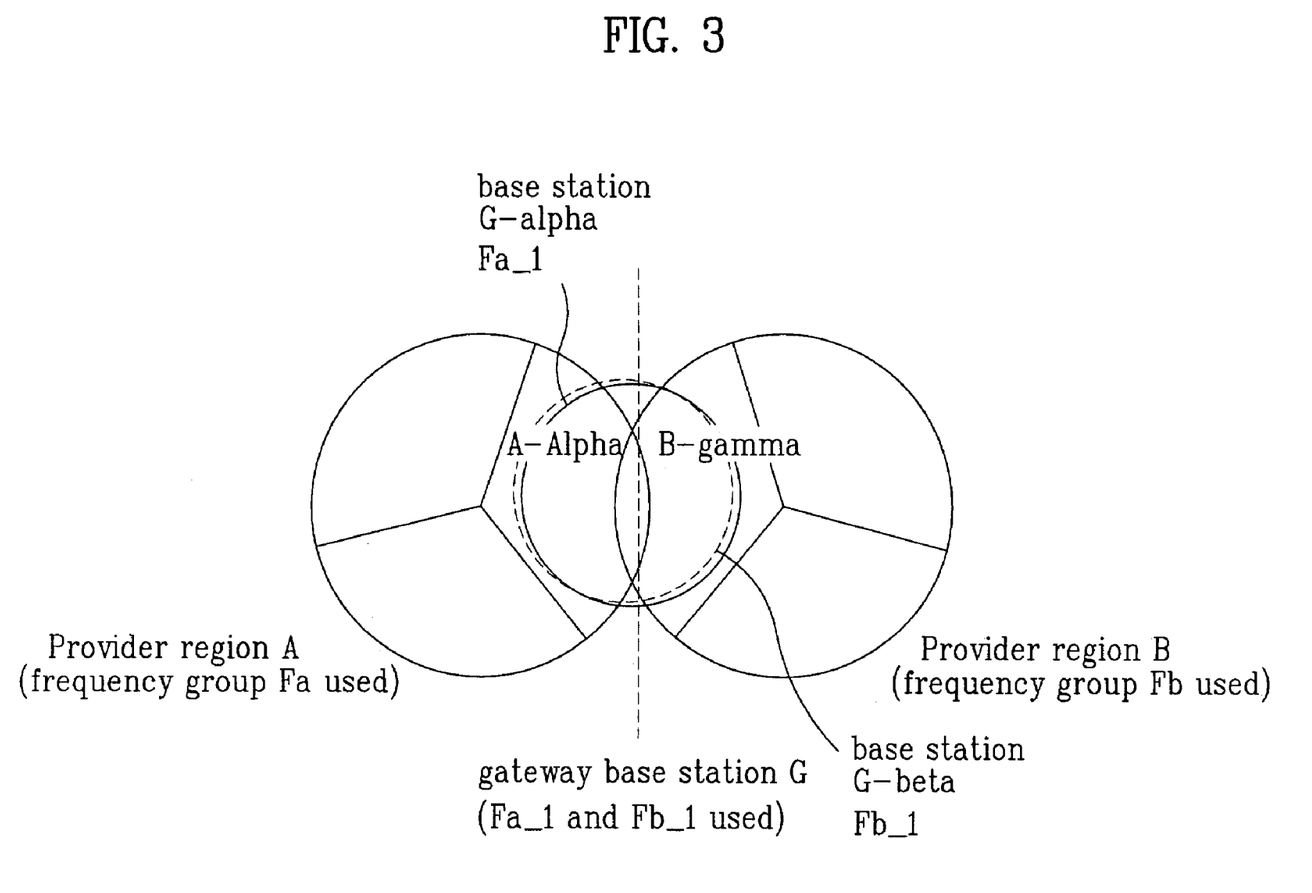
FIG. 3 is a diagram illustrating an exemplary embodiment of a handoff cell performing a handoff between different networks according to a preferred embodiment of the present invention.

Hereinafter, the operation of the respective elements will be explained with reference to FIG. 3. FIG. 3 is a diagram illustrating an exemplary handoff cell performing a handoff between different network provider regions according to a preferred embodiment of the present invention.

First, the gateway base station 108 is a base station coupled in a boundary area of the two sub-communication systems, and performs the same function as the general base stations, 105 and 106. The gateway base station 108 is coupled in a manner that it controls and manages at least one portion of two sectors, e.g., an alpha sector (A alpha) and a gamma sector (B gamma), which are located in the boundary area of the two sub-communication systems. It is assumed that the gateway base station 108 manages at least one of a G-alpha sector and a G-beta sector on assumption that the handoff cell includes the G-alpha sector for signal using frequency Fa and G-beta sector for signal using frequency Fb.

The gateway base station 108 uses, as a commonly used frequency, respective primary frequency groups of frequency groups used in the two base stations which belong to the different network provider regions (or sub-communication systems) unlike the general base stations 105 and 106.

As shown in FIG. 3, the handoff cell is constructed so that its radius is respectively overlapped with radii of an alpha sector (A alpha) and a gamma sector (B gamma), which respectively belong to the terminal base station 105 of the network provider of cell A using the frequency group Fa and the terminal base station 106 of the network provider of cell B using the frequency group Fb.

A plurality of mobile stations of the alpha sector and/or the gamma sector may receive signals having the same signal strength from omni directonal antennas of the gateway base station. It is assumed that the A alpha sector is managed by the sub-communication system of the network provider A, while the B gamma sector is managed by the sub-communication system of the network provider B.

When a mobile station moves from cell A to cell B, a frequency range Fa-1 that is a primary frequency range of the frequency groups Fa which are used in the cell A is used in the alpha sector, and a frequency range Fb-1 that is a primary frequency of the frequency groups Fb which are used in the cell B is used in the gamma sector. In other words, only the respective primary frequency ranges are used by the gateway base station, among the frequency groups which are used in the cells A and B.

Meanwhile, in performing a handoff, the gateway base station 108 performs at least one of an inter-sector hard handoff and an inter-frequency hard handoff of a call from cell A to cell B, or from cell B to cell A. The same message that is used for the general handoff method is used for the at least one of the inter-sector handoff and inter-frequency handoff.

The gateway control station 107 performs the CDMA frame selection during the soft handoff that is the primary function of the general control stations 103 and 104 as it stands, but does not perform a transcoding function for converting the CDMA frame into a PCM (pulse code modulation) frame. Instead, the gateway control station 107 operates with the control stations 103 and 104 of the two sub-communication systems, and thus it should accommodate all of the communication standards used in the two sub-communication systems.

Figure 4:
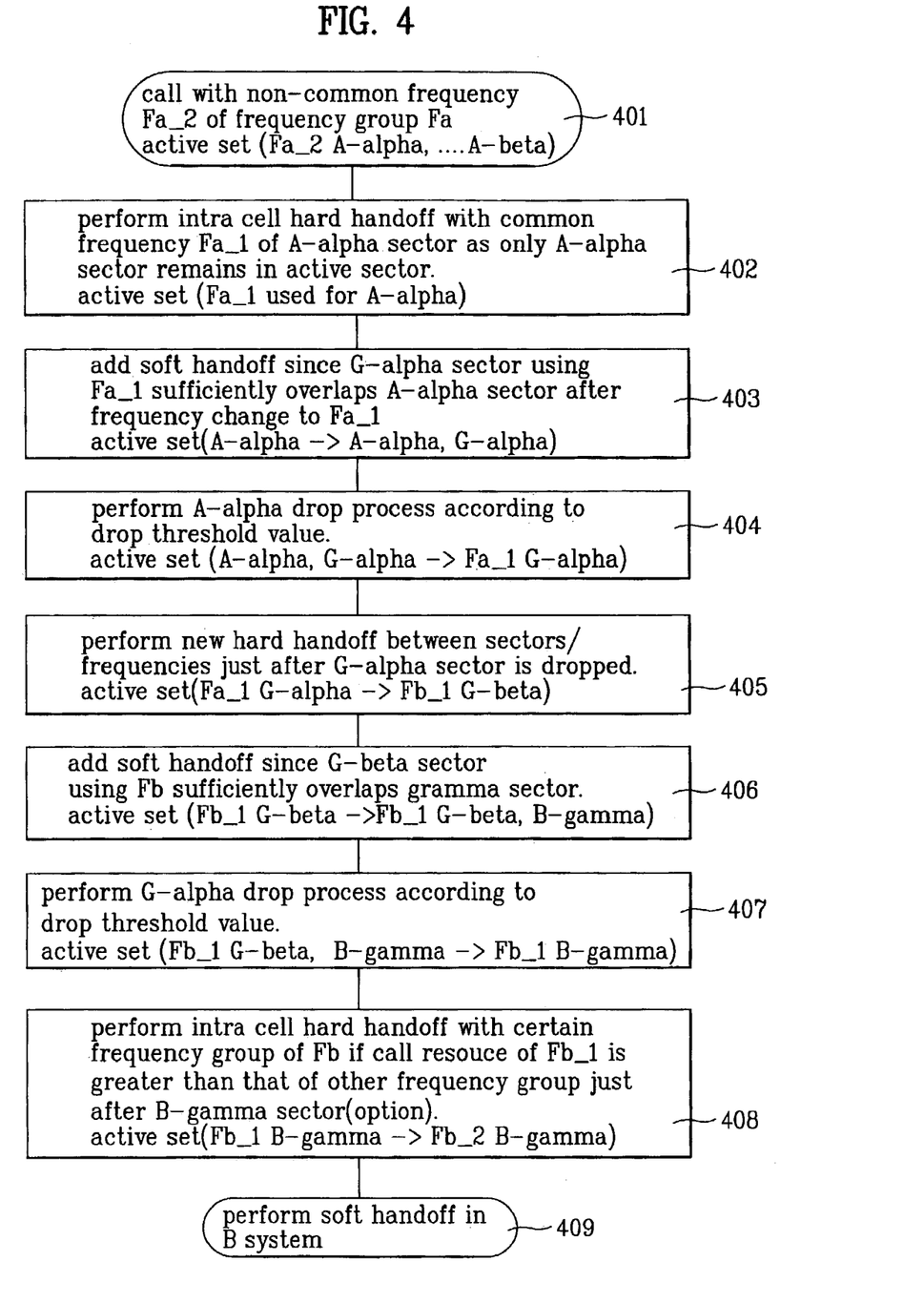
FIG. 4 is a flowchart illustrating an exemplary handoff process between network provider regions proposed according to a preferred embodiment of the present invention.

Hereinafter, the handoff process performed in the mobile communication system of FIG. 2 according to a preferred embodiment of the present invention will be explained with reference to FIG. 4. FIG. 4 is a flowchart illustrating the handoff process between network provider regions according to a preferred embodiment of the present invention.

FIG. 4 shows the handoff process performed when the mobile station moves from the network provider region A to the network provider region B. Conversely, the handoff process performed when the mobile station moves from the network provider region B to the network provider region A is substantially the same.

If the mobile station communicates using a frequency range Fa-2 among frequency groups Fa in terminal of the network provider region A as it moves from the network provider region A to the network provider region B, several cells including the A-alpha sector are added to an active set (S401).

Thereafter, when the mobile station approaches the network provider region B, only the A-alpha sector exists in the handoff active set (i.e., base stations corresponding to the mobile station), the sub-communication system that belongs to the provider region A performs an intra-cell hard handoff of a call from the A-alpha sector to the G-alpha sector with a change of the frequency range Fa-2 to the primary frequency range Fa-1 of the network provider region A in order to prepare a first soft handoff to G-alpha sector of the gateway base station (S402).

Since the intra-cell hard handoff substantially changes only those resources within the same cell as allocated to the mobile station, the rate of failure approaches zero.

Since the same frequency used for the A-alpha sector of the network provider region A is used in the G-alpha sector, the soft handoff is performed between the A-alpha sector and the G-alpha sector if the strength of a signal from the G-alpha sector is greater than an add threshold value. (S403) That is, the active set of the mobile station becomes {A-alpha, G-alpha}. In this state, the CDMA frame is processed inter-working the gateway control station and the control station of the first system region A.

Then, if the mobile station further approaches the network provider region B, the A-alpha sector of the provider region A is dropped in the active set, and only the G-alpha sector is included in the active set (S404). Then, in the handoff cell for the gateway base station, the gateway base station performs at least one of the inter-frequency hard handoff and inter-sector hard handoff between the sectors using different frequency groups, respectively (S405).

As explained with reference to FIG. 3, the hard handoff is performed in a condition where the radii of the A-alpha sector of the cell A in the network provider region A and the B-gamma sector of the cell B in the network provider region B, are completely overlapped so that the same signal strength from the omni antennas is provided to the sectors. Also, the hard handoff is performed between the two sectors under control of a gateway base station. Therefore, the rate of a handoff failure becomes very small.

After the hard handoff is performed, the frequency range used by the gateway base station is set to Fb-1, and the active set is set to inclusive of {G-beta}.

When the mobile station closely approaches the provider region B, the strength of a pilot signal, from the B-gamma sector is located in terminal of the cell B to the mobile station, is greater than an add threshold value, the sub-communication system of the network provider region B performs a second soft handoff from the G-beta sector to the B-gamma sector (S406). After the second handoff, the active set is set to inclusive of {Fb-1 G-beta, B-gamma}. In this state, the CDMA frame is processed inter-working the gateway control station and the control station of the first system region B.

Thereafter, if the mobile station belongs to the provider region B, the strength of a pilot signal, from the G-beta sector to the mobile station, is less than a drop threshold value, the G-beta sector is dropped in the active set, and only the B-gamma sector of the provider region B is included in the active set (S407). Through the last procedure, the handoff from a base station located in terminal of the network provider A to a base station located in terminal of the network provider region B is completed smoothly without a disconnection.

As described above, since the handoff from the provider region A to the provider region B is performed through the multistage process, the ping-pong phenomenon is prevented from being produced. Also, the rate of handoff success becomes very high, and the traffic communication quality is greatly improved.

Meanwhile, in the situation where the number of calls using the primary frequency Fb-1 of network provider region B is greater than that of the number of calls using other frequency groups, the base station in the network provider region B performs intra-cell hard handoff so that only the primary frequency Fb-1 may not be excessively occupied in the provider region B (S408). An overload on using the resource of the primary frequency group can be solved by performing the intra-cell hard handoff with one among other frequency groups used in the provider region B.

On the other hand, in the cell B of the network provider region B, a second soft handoff may be produced if the a signal strength of pilot signal from other sector of the cell B. (S409)

Finally, in the provider region B, the soft handoff is smoothly produced between other B base stations adjacent to the terminal base station G-beta of the provider region B.

Although the exemplary embodiment described above shows an example of the handoff procedure in the direction from the A provider region to the B provider region, the handoff procedure in the reverse direction can be also performed by processing the above procedure in the reverse order. That is, the handoff in the forward direction is substantially identical to the hand off in the reverse direction.

As described above, according to the present invention, the handoff can be stably performed between the different systems or between the 2G-3G systems during the operation of the CDMA mobile communication system.

First, the present invention can remove the ping-pong phenomenon that is a problem associated with the conventional system or method, and thus the call disconnection is not produced during the handoff operation. Also, according to a preferable embodiment of the present invention, the handoff is processed by sequentially performing the soft handoff, the hard handoff between the sectors, and then the soft handoff unlike the conventional handoff process. Therefore, the possibility of handoff failure due to the forward or reverse path problems is greatly reduced.

Second, the gateway base station used in the present invention does not use the all the frequency groups used in both the different networks, but uses only one frequency group for each network. Accordingly, the cost is reduced.

Third, as described above, the gateway base station and the gateway control station applied to the present invention use the standards used in both the two systems, and thus the handoff between not only the different providers but also the systems adopting the different standards such as 2G-3G systems can be processed.

Fourth, according to the present invention, since the two systems match each other through the gateway control station, the present invention can be further applied to the handoff of a data call such as an IWF-PSDN inter-working between 2G-3G systems, IWF-IWF inter-working between 2G-2G systems, PDSN-PDSN inter-working between 3G-3G systems, etc., without the necessity of a separate device.

It will be apparent to those skilled in the art than various modifications and variations can be made in the present invention. Thus, it is intended that the present invention covers the modifications and variations of this invention provided they come within the scope of the appended claims and their equivalents.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A mobile communication system comprising:
   a first communication system configured with a first mobile switching center and a second communication system configured with a second mobile switching center that each use different frequency groups, respectively;
   a gateway control station for performing matching of the first and second communication systems for a handoff process between the two systems, wherein the gateway control station is connected to base station controllers respectively connected to the first and second mobile switching centers; and
   a gateway base station connected to the gateway control station for using respective primary frequency groups of first and second terminal base stations of the first and second communication systems, respectively, and controlling a handoff cell defined as at least a portion of two sectors that respectively belong to the two base stations of the two systems, wherein the handoff between the first communication system and the second communication system is a multiple stage process.

2. The system of claim 1, wherein one portion of the handoff cell includes a portion of the cell that belongs to the first system, and another portion of the handoff cell includes a portion of the cell that belongs to the second system.

3. The system of claim 2, wherein the two portions of the handoff cell are overlapped with a same signal strength from antennas.

4. The system of claim 3 wherein the antennas are omnidirectional antennas.

5. The system of claim 3, wherein the two portions are substantially overlapped and have substantially a same radii.

6. The system of claim 1, wherein the handoff between the two systems includes the multiple stage processes of intra-cell hard handoff to a primary frequency of the first base station, a first soft handoff at least one of an inter-frequency hard handoff and an inter-sector hard handoff, and a second soft handoff to a primary frequency of the second base station.

7. A method of processing a handoff in a mobile communication system, comprising:
   arranging a gateway control station that accommodates all standards of a network provider region A using frequency groups Fa and a network provider region B using frequency groups Fb and a gateway base station that matches the communication channels of the gateway control station in a boundary area of the provider regions A and B, wherein the frequency groups Fa and Fb do not overlap;
   defining a handoff cell belonging to the gateway station by overlapping sectors belonging to respective base stations of the provider region A and the provider region B, wherein the sectors are overlapped with a same signal strength using an omni directional antenna;
   selecting a primary frequency group Fa-1 of the frequency groups Fa and a primary frequency group Fb-1 of the frequency groups Fb as frequency groups commonly used by the gateway base station; and
   processing a handoff in multiple stages that includes a soft handoff and a hard handoff when a mobile station moves from a sector of one of the regions A and B to a sector of the other of the regions passing through the handoff cell.

8. The method of claim 7, wherein the gateway base station includes a handoff function between the sectors and a handoff function between the frequency groups during a handoff control operation.

9. The method of claim 8, wherein the multistage handoff procedure includes sequential processes of intra-cell hard handoff to the primary frequency group Fa-1, a first soft handoff, at least one of an inter-frequency hard handoff and an inter-sector hard handoff, and a second soft handoff to the primary frequency group Fb-1.

10. The method of claim 7, further comprising: if a number of calls using the primary frequency Fb-1 in the provider region B is greater than that of other calls using frequency groups, performing an intra-cell hard handoff of the calls from the primary frequency Fb-1 to one of the other frequency groups used in the provider region B.

11. The method of claim 7, wherein the first and second network provider regions A and B are respectively controlled by different mobile switching centers.

12. A method of processing a handoff in a mobile communication system, comprising:
   performing an intra-cell handoff of a call in a first communication system using first frequency groups when a first sector of a first terminal base station of the first system is included in an active set;
   performing a first soft handoff of the call from the first sector to one portion of a handoff cell that is defined as at least a portion of two sectors that respectively belong to a first base station of the first system and a second base station of a second communication system using second frequency groups different from the first frequency groups when the one portion of the handoff cell is added in the active set;
   performing at least one of an inter-frequency handoff and inter-sector handoff of the call from the one portion to an other portion of the handoff cell, when the first sector is dropped in the active set; and
   performing a second soft handoff of the call from the other portion of the handoff cell to a second sector of a second terminal base station of the second system, when the second base station is added in the active set to complete a transfer from the first to the second system.

13. The method of claim 12, further comprising: if a number of calls using a predetermined frequency group of the second system is greater than that of other calls using frequency groups, performing an intra-cell handoff of the call from the predetermined frequency group to one of the other frequency groups used in the second system.

14. The method of claim 12, wherein the first and second communication systems use different mobile switching centers.

15. A mobile communication system comprising:
- a controller for matching communication channels of at least two communication system regions respectively controlled by first and second different mobile switching centers and enabling handoff between the regions;
- a base station coupled in a boundary area of the at least two communication regions wherein said base station manages at least one sector of the boundary area and communicates with at least one base station located in one communication region and communicates with another base station located in another communication region; and
- the base station coupled in the boundary area communicates with the other base stations at a common frequency or frequencies and controls handoff between the other base stations in a handoff cell which is defined as at least a portion of two cell sectors that belong to the at least two base stations and uses the common frequency or frequencies.

16. The system of claim 15, wherein the base station coupled in the boundary area is a gateway base station.

17. A method of processing a handoff in a mobile communication system comprising:
- arranging a gateway control station that supports communication between network provider region A and a network provider region B and a gateway base station that matches the gateway control station in a boundary area of the provider regions A and B;
- defining a handoff cell assigned to the gateway control station by overlapping sectors that are serviced by base stations in provider regions A and B, wherein the sectors that are overlapped are provided with a same signal strength;
- selecting at least two primary frequency groups supported by the gateway base station; and
- processing a handoff in multiple stages that includes at least one soft handoff and at least one hard handoff when a mobile station moves from a sector of one of the regions A and B to a sector of the other of the regions passing through the handoff cell, and wherein first and second network provider regions A and B are respectively controlled by different mobile switching centers.

18. The method of claim 17, wherein the handoff between the two systems includes sequential processes of intra-cell hard handoff to a primary frequency of the first base station, a first soft handoff at least one of an inter-frequency hard handoff and an inter-sector hard handoff, and a second soft handoff to a primary frequency of the second base station.

19. The method of claim 17, wherein the network provider region A uses frequency groups Fa that do not overlap frequency groups Fb used by the network provider region B.

* * * * *